(12) United States Patent
English

(10) Patent No.: US 7,870,025 B2
(45) Date of Patent: Jan. 11, 2011

(54) VENDOR COMPARISON, ADVERTISING AND SWITCHING

(75) Inventor: Paul English, Arlington, MA (US)

(73) Assignee: Intuit Inc., Mountain View, CA (US)

( * ) Notice: Subject to any disclaimer, the term of this patent is extended or adjusted under 35 U.S.C. 154(b) by 1908 days.

(21) Appl. No.: 09/957,643

(22) Filed: Sep. 20, 2001

(65) Prior Publication Data
US 2003/0055723 A1    Mar. 20, 2003

(51) Int. Cl.
G06Q 30/00    (2006.01)
(52) U.S. Cl. ............... 705/14.49; 705/14.6; 705/14.19; 705/347
(58) Field of Classification Search ............. 705/14.49, 705/14.6, 14.19, 347
See application file for complete search history.

(56) References Cited

U.S. PATENT DOCUMENTS

| | | | |
|---|---|---|---|
| 5,220,501 A | | 6/1993 | Lawlor et al. |
| 5,870,724 A | | 2/1999 | Lawlor et al. |
| 6,128,603 A | | 10/2000 | Dent et al. |
| 6,311,194 B1 | | 10/2001 | Sheth et al. |
| 6,578,015 B1 | * | 6/2003 | Haseltine et al. ............ 705/34 |
| 7,076,458 B2 | * | 7/2006 | Lawlor et al. ............... 705/35 |
| 7,406,436 B1 | * | 7/2008 | Reisman ..................... 705/10 |
| 2001/0020242 A1 | | 9/2001 | Gupta et al. |
| 2002/0174013 A1 | * | 11/2002 | Freeman et al. ............. 705/14 |
| 2003/0126146 A1 | * | 7/2003 | Van Der Riet ............. 707/100 |

FOREIGN PATENT DOCUMENTS

WO    01/08067 A1    2/2001

OTHER PUBLICATIONS

Pete <i...@n0n.co.uk>, "Re: Can anyone recommend a dentist?", Mar. 15, 2001, posting to usenet newsgroup uk.local.cumbria.*
"Why Should I Enter Vendors in QuickBooks?," Intuit, QuickBooks 2001, Your Guide to Better Business Decisions, QuickBooks User's Guide, Chapter 12, pp. 189-198, Dec. 2000.
"How Should I Track the Money I Spend?," Intuit, QuickBooks 2001, Your Guide to Better Business Decisions, QuickBooks User's Guide, Chapter 14, pp. 221-246, Dec. 2000.

(Continued)

*Primary Examiner*—Jeffrey D Carlson
(74) *Attorney, Agent, or Firm*—Osha • Liang LLP

(57) ABSTRACT

A method for switching vendors, including sending an invitation to a user to rate a first vendor in response to the user designating the first vendor as a payee, receiving a rating assigned to the first vendor, determining a second vendor as an alternative to the first vendor based on the rating being below a predefined threshold, sending information associated with the second vendor to the user, receiving a request from the user to switch from the first vendor to the second vendor, sending a cancellation notice to the first vendor in response to receiving the request, transmitting user information to a computer of the second vendor for setting up a new account, and charging the second vendor a fee for sending the information associated with the second vendor to the user.

12 Claims, 11 Drawing Sheets

OTHER PUBLICATIONS

PCT/US02/30011 PCT Written Opinion (PCT Rule 66) dated Jun. 29, 2007, 5 pages.

PCT/US02/30011 International Search Report dated Jan. 30, 2004, 1 page.

eBay.com, "Welcome to eBay!", http://web.archive.org/web/19970614001443/http://www.ebay.com, eBay Inc., Jul. 14, 1997, 1 page.

Canadian Official Action dated Jun. 29, 2010 for Canadian Patent Application Serial No. 2,460,322, 5 pages.

* cited by examiner

*300*

Quicken.com | MYFINANCES | BILLS & BANKING | INVESTING LOANS TAXES RETIREMENT | SMALL BUSINESS | -SAVINGS -INSURANCE Banking Center | Bills | Accounts | Online Banking | Credit | Saving | Loans Name | View & Pay Bills | E-Billets & Payees | Past Payments & Bills | Customer Service | Profile | Help | Sign Out Account Name   Balance     As of Date   Total Payments
My Checking    $1,586.45   1/25/2001    $ 82.60         (Proceed to Send Payments)

*310*

Pay Incoming Bills - Check Pay then Click Proceed to Send payments

| Rate Your Vendor | Receive Alternate Vendors | Past Payments | Name | Description & Account Number | Delivery Date (mm/dd/yy) | or | ASAP (04/16/01) | Amount | Pay |
|---|---|---|---|---|---|---|---|---|---|
| ☐ | 👍👎 | 📄 | Pacific Bell | Home Phone [32135433] | 04/23/01 | | ☐ | $ 32.17 | ☐ |
| | | | Full payment of $32.17 or minimum payment of $32.17 due 4/25/2001 | | | | | | |
| ☐ | 👍👎 | 📄 | AT&T Wireless | Call Phone - Work [9839-3212332] | 05/03/01 | | ☐ | $ 50.43 | ☐ |
| | | | Full payment of $50.43 or minimum payment of $50.43 due 5/5/2001 | | | | | | |

*345* — *335* *340* *325* — Add a New E-Biller          View Status of Current E-Billers

*330*

Send Other Payments - Check Pay then Click Proceed to Send Payments     *320*

| Rate Your Vendor | Receive Alternate Vendors | Past Payments | Name | Description & Account Number | Delivery Date (mm/dd/yy) | or | ASAP (04/16/01) | Amount | Pay |
|---|---|---|---|---|---|---|---|---|---|
| ☐ | 👍👎 | 📄 | Johnson Garden Supply | Johnson Garden Supply [NA] | | | ☐ | $ 316.28 | ☐ |
| ☐ | 👍👎 | 📄 | One Day Dry Cleaning | One Day Dry Cleaning [NA] | | | ☐ | $ 34.54 | ☐ |
| | | 📄 | Steve Looper | Steve Looper [NA] | | | ☐ | $ 100.00 | ☐ |
| ☐ | 👍👎 | | (Select A Payee) ▼ | | | | ☐ | $ | ☐ |
| | | | (Select A Payee) ▼ | | | | ☐ | $ | ☐ |
| | | | (Select A Payee) ▼ | | | | ☐ | $ | ☐ |

(Add A New Payee)

Account Name   Balance     As of Date   Total Payments
My Checking    $1,586.45   1/25/2001    $ 82.60         (Proceed to Send Payments)

*FIG. 3*

VENDOR COMPARISON, ADVERTISING AND SWITCHING

TECHNICAL FIELD

The present invention relates to the field of electronic financial transactions, and in particular, to enabling consumers to compare and switch vendors, goods or services at an electronic "point of payment" ("POP"), or while otherwise using a financial management system, while enabling vendors to advertise to targeted groups of consumers.

BACKGROUND OF THE INVENTION

Financial management systems and applications for electronically tracking financial transactions, balancing checkbooks, following investments, paying bills and the like have become increasingly popular as the capabilities of such programs have increased. Current financial management applications, such as Quicken® 2001 and QuickBooks® 2001, available from Intuit Inc. of Mountain View, Calif., enable users to pay bills and record and track payments and other financial transactions with vendors—whether they use checks, cash, credit cards or electronics fund transfers ("EFTs"). For example, with the electronic checkbook feature of these programs, a user may pay long distance telephone suppliers, cable television companies and other vendors by electronically preparing checks via the program's graphical user interface ("GUI"). The user can also employ the financial management system to record payments already made (whether by cash, check, credit card or EFT). Alternatively, the user can access Quicken.com or other online transactional services, to pay bills online without the use of printed checks. The term "online transaction" is used generally herein to denote any payment, purchase or other electronic activity in which transaction information is exchanged between a vendor and a user.

These systems enable a user to track the amount of money he or she spends on taxes, clothing, dining out, or other products, services, commodities or offerings, by assigning each check or payment to an appropriate category of vendors, goods or services. The user may then have the financial management system generate a report periodically to determine the amounts in each category. Many users find this feature extremely helpful for preparing tax returns or keeping within a budget.

When a user is paying bills or recording payments, whether manually or in a financial management system, using an electronic checkbook, checkbook "register," or in an online banking setting, he may realize that he is dissatisfied with a particular vendor, or may wonder whether an alternative vendor might offer better prices or quality of service. When making a payment at an electronic "point of payment" ("POP"), or while otherwise using the financial management system (such as to record payments), the consumer is particularly receptive to offers from other vendors, or even a change of vendors. It is not difficult to imagine, for example, that a consumer paying his or her monthly long-distance telephone service bill might be dissatisfied with his current provider, and thus highly susceptible to changing providers—if only relevant pricing information could be presented to that consumer when he is paying the bill, recording a payment, or otherwise using a financial management system. The consumer might also welcome the opportunity to make known his or dissatisfaction with the provider, or to otherwise "rate" the provider. In conventional bill-paying systems, however, the user must interrupt the bill-paying session and turn to other means to investigate alternative vendors and obtain pricing, availability and other information. Similarly, to make his dissatisfaction known, he would have to contact the company directly by telephone, email, over the web, or the like. As a result, the moment at which the consumer may be most receptive to marketing and vendor switchover is lost.

In short, conventional electronic bill-paying or online banking products, whether client PC-based or online server-based, do not enable users making a payment or otherwise using a financial management system, to automatically receive or interactively request information regarding alternate vendors, goods or services. There is accordingly a need for methods and systems that enable users, while making a payment at the POP, recording a payment, or otherwise using a financial management system, to automatically receive or interactively request price, user-ratings, and other information about alternative goods, services and vendors, and if desired, to immediately switch vendors. There is also a need for systems that enable consumers to rate vendors, and vendors to target groups of consumers with advertising and promotional activities.

SUMMARY OF THE INVENTION

The present invention enables consumers at an electronic point of payment ("POP"), or while electronically recording a payment or otherwise using a financial management system, to automatically receive or interactively request information about alternative vendors. Users can request information regarding the products or services provided by an alternate vendor, rate vendors, and even switch vendors by signaling their selections. Vendor switching is simplified by storing, and transmitting to the newly selected vendor, the user account information necessary to enable the new vendor to effectuate the switchover.

In one embodiment, a system maintains a vendor database containing information about each vendor, which may include aggregated user-rating information, vendor e-mail addresses, geographical location, and the like. Information about alternative vendors can be obtained by reference to this database. Vendors may pay for inclusion in the vendor database, for advertising to targeted user groups, and for preferential display placement at the POP or elsewhere within the web pages or displays generated by the invention. Conversely, customer account and spending information can be aggregated in a user database for analysis and targeted marketing.

A system in accordance with the present invention can be accessed by a user from a PC, Internet appliance, wireless communications device or other conventional processor capable of communicating with the applications described herein. Alternatively, the invention can be implemented within an existing financial management system on the user's processor. The financial management system can include a conventional electronic checkbook or online banking software application providing a graphical user interface for electronic check-writing, an online bill payment system, a system for payment recording, or the like.

In one embodiment, when the user reaches a selected point in the process of paying a bill, recording a payment, or accessing a payee list in the financial management system, the user can rate the vendor and indicate his or her level of satisfaction with the vendor, goods or services. User-selectable icons representative of satisfaction or dissatisfaction ("thumbs up"/ "thumbs down") are displayed, and if the user selects the "thumbs down" icon, the system accesses and searches the vendor database, based upon the vendor information already entered by the user. The system then retrieves and displays information representative of one or more alternative vendors from which the user may obtain the same or similar goods and services. Thus, for example, when a consumer uses the system to pay a monthly long-distance telephone bill, and indicates dissatisfaction with the long-distance provider, the system will display information of one, or a list of, alternative long-distance providers, and may further display user-ratings, service plans and pricing for each alternative.

In another embodiment, the information about alternative vendors is provided automatically during the payment transaction or other usage of the financial management application, without requiring a "thumbs down" or other vendor rating response from the user.

The POP or other displays provided by the financial management system can be used for targeted advertising. For example, a user paying a long-distance telephone bill, recording a payment to a long-distance provider, or otherwise accessing the name of a provider in his payee list, will receive a display of ads and other information of alternative providers.

The system also enables "one-click vendor switching"— i.e., the user can immediately switch vendors, while at the POP, or otherwise using the financial management system, by clicking on an icon representative of the new vendor or otherwise signaling his selection of a new vendor. In this case, the system responds to the vendor-switching request by notifying the first vendor that the user is canceling service and transmitting, to the second vendor, a request to conduct future transactions between the user and the second vendor. The system also transmits account information to enable the second vendor to establish an account with the user. This may include personal information identifying the user, information about previous transactions between the user and the first vendor, and the like. In such a case, the account information can be received and transmitted in a secure manner, with appropriate, robust safeguards to preserve user privacy.

In one embodiment, the vendor database contains information representative of vendors and the goods and services each offers, including vendor names, e-mail addresses, geographic locations, and categories of goods and services offered. Vendor records in the vendor database can also contain corresponding user ratings, advertising and marketing information and other textual and/or graphical information associated with each vendor, which can be delivered to users at the POP or elsewhere in the financial management system. Vendor database information can be compiled from telephone and similar directories, or from a list of vendors who have paid for registration therein.

Conversely, a database of aggregated user information ("user info aggregate DB") can be provided for use by vendors for demographic analysis and targeted marketing and advertising. To preserve user privacy, user information to be aggregated is "anonymized" prior to storage and/or access by vendors. In a one-click vendor switching example, the new vendor may pay a fee in response to the user's request to switch to the new vendor.

In order to obtain information about alternatives, the system can utilize transaction or vendor information, such as identity, goods/services category, geographic location, size and user-ratings of the current vendor, and user information, including location, preferences and other demographic data. The system can then search the vendor database for vendors, goods or services satisfying selected criteria, such as geographical locality, price point, similarity and quality of goods and services.

In one practice of the invention, the system obtains information about alternatives by first automatically obtaining information about the current vendor, either when the user enters the vendor name in a payment, or by reading the user's payee list in the financial management system. Alternatively, the system can read information about a product (or category of product) purchased from a current vendor, and offer information about alternative vendors or products on that basis.

The invention can be used in check-writing, payment recording, and other financial management systems capable of connecting to the Internet, as well as Internet-based or direct dial-up electronic banking systems. The invention enables rapid comparison of vendor alternatives, broad-based user ratings, simplified vendor switching, and generation of revenue through vendor registration and targeted advertising.

The invention can be embodied in various forms, including desktop application software, websites, user interfaces, system architectures, software program products, or even dedicated hardware devices.

BRIEF DESCRIPTION OF THE DRAWINGS

FIG. 3 depicts an example of a graphical user interface screen generated by an alternative practice of the invention, in an online banking environment.

DETAILED DESCRIPTION OF THE INVENTION

Overview

One embodiment of the present invention is an improvement to financial management computer programs used to provide personal (or small business) financial management. Example of such applications include Quicken® 2001 and QuickBooks® 2001 available from Intuit Inc. of Mountain View, Calif. Microsoft Money from Microsoft Corp., of Redmond, Wash., or Peachtree Accounting, from Peachtree Software, of Norcross, Ga. The design, structure and operation of such programs are well understood by those of ordinary skill in the art and need not be described in detail here. However, several features of the prior art are generally described below to provide an understanding of how the present invention works within a financial management program. It should be understood, though, that the present invention can be practiced separately from such prior programs, if desired.

In one practice of the invention, when a user electronically writes a check to a vendor, pays the vendor's invoice or records a payment to the vendor in an electronic financial management system, user-selectable vendor approval/disapproval icons ("thumbs up"/"thumbs down") are displayed at the electronic point of purchase ("POP"), or on the payment recording screen, as applicable. If the user selects the "thumbs down" icon to express dissatisfaction with a current vendor, one or more alternative vendors selected from a vendor database are displayed, along with corresponding offerings, prices, user-ratings, logos and other graphical information.

In another embodiment, information about alternatives is automatically provided to the user, without requiring thumbs up/thumbs down input from the user.

In a further aspect of the invention, when the financial system accesses a payee list (such as when the user reviews previous payments prepares reports), information about alternatives can be provided automatically, or upon user request.

In yet another aspect, the invention enables users to switch vendors with one click, by clicking on a new vendor icon. Since the invention relates in part to the graphical communication of information to and from users of the system, one form of suitable user interface will next be described, followed by the system architecture and method aspects of the invention.

Figure 1:
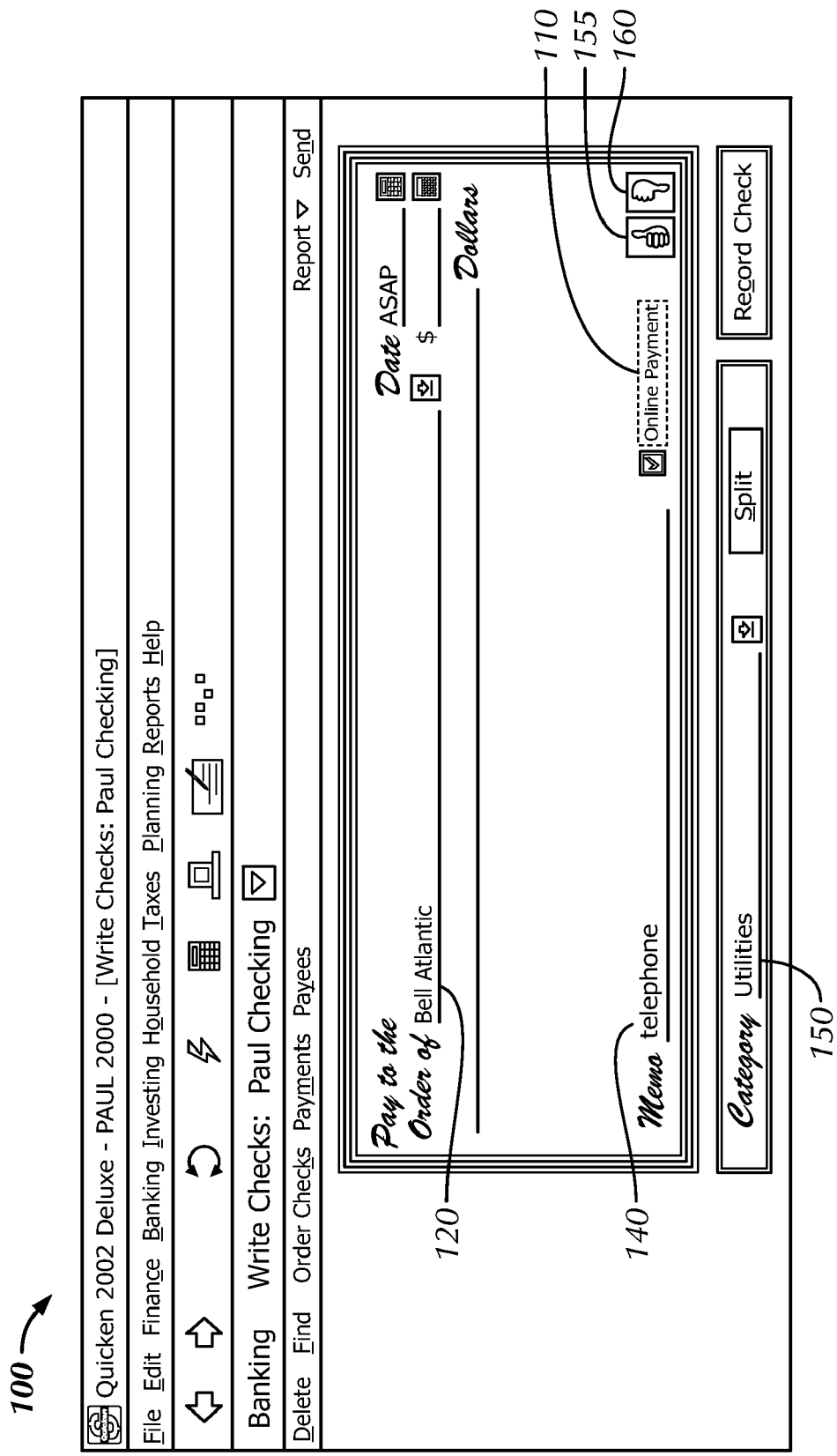
FIG. 1 depicts a user interface screen generated in accordance with the present invention.

User Interface Aspects:

FIG. 1 depicts a portion of a user interface of a financial management application in accordance with the present invention. Such an interface can be utilized in a local, PC-based check-writing system, payment recording system, or financial management system; or in an online banking system. Referring to FIG. 1, screen 100 illustrates one example of the graphical information displayed to a user of the invention during an electronic check-writing or bill-paying session. In the check-writing example shown, the user interface displays a form resembling a conventional check, with fields in which the user can enter financial information, such as payee or vendor name, amount of payment, date, and the like. More particularly, the user interface comprises a check writing area 110 and a toolbar for user commands. The check writing area 110 includes a payee field 120 and a category field 140.

In operation, the user enters the name of the vendor (in this example, "Bell Atlantic") in the payee vendor field 120. The user also enters additional information in the memo field 140, in this instance, "Telephone"; and in the category field 150, in this instance "Utilities". To this point, FIG. 1 resembles the graphical user interface presented by Quicken 2001, QuickBooks 2001 and similar conventional software programs.

Unlike conventional check-writing software programs, however, this embodiment of the invention provides additional information display and information collection features. For example, as shown, a field is provided for indication of the user's level of satisfaction or dissatisfaction with the vendor to be paid, or goods or services rendered. A "thumbs up" icon 155 and a "thumbs down" icon 160 are provided on the user interface screen 100, which the user can click to indicate either satisfaction ("thumbs up") or dissatisfaction ("thumbs down") with the designated vendor, goods or services.

In one embodiment of the invention, the thumbs icons are displayed as soon as the user designates a payee. Alternatively, the thumbs icons can be always present on the relevant displays, but grayed-out (disabled) until vendor information is provided. Other points in the bill-paying, check-writing, or payment-recording session can be utilized equivalently, and as discussed hereinafter, these features may be provided at any point during the user's access to a financial management application.

It will be understood that other graphical elements can be used to elicit user feedback regarding customer satisfaction, including numerical scales (e.g., 1-10), letter grades (A-D and F), menu choices in a drop-down menu, radio buttons, or the like. User ratings are not limited to expressions of customer satisfaction, but may be provided for any characteristic or dimension of the vendor, product or transaction, including cost, quality, timeliness or the like. In addition, ratings may be based on combinations of different factors. A binary satisfaction rating (e.g., thumbs up or down) has the benefit of being very easily understood by users, and very simple for consumers to respond to, as opposed to more complex multi-factor or multi-value ratings schemes. As a result, there is a greater likelihood of collection of rating information from more customers using a binary satisfaction rating.

Figure 2:
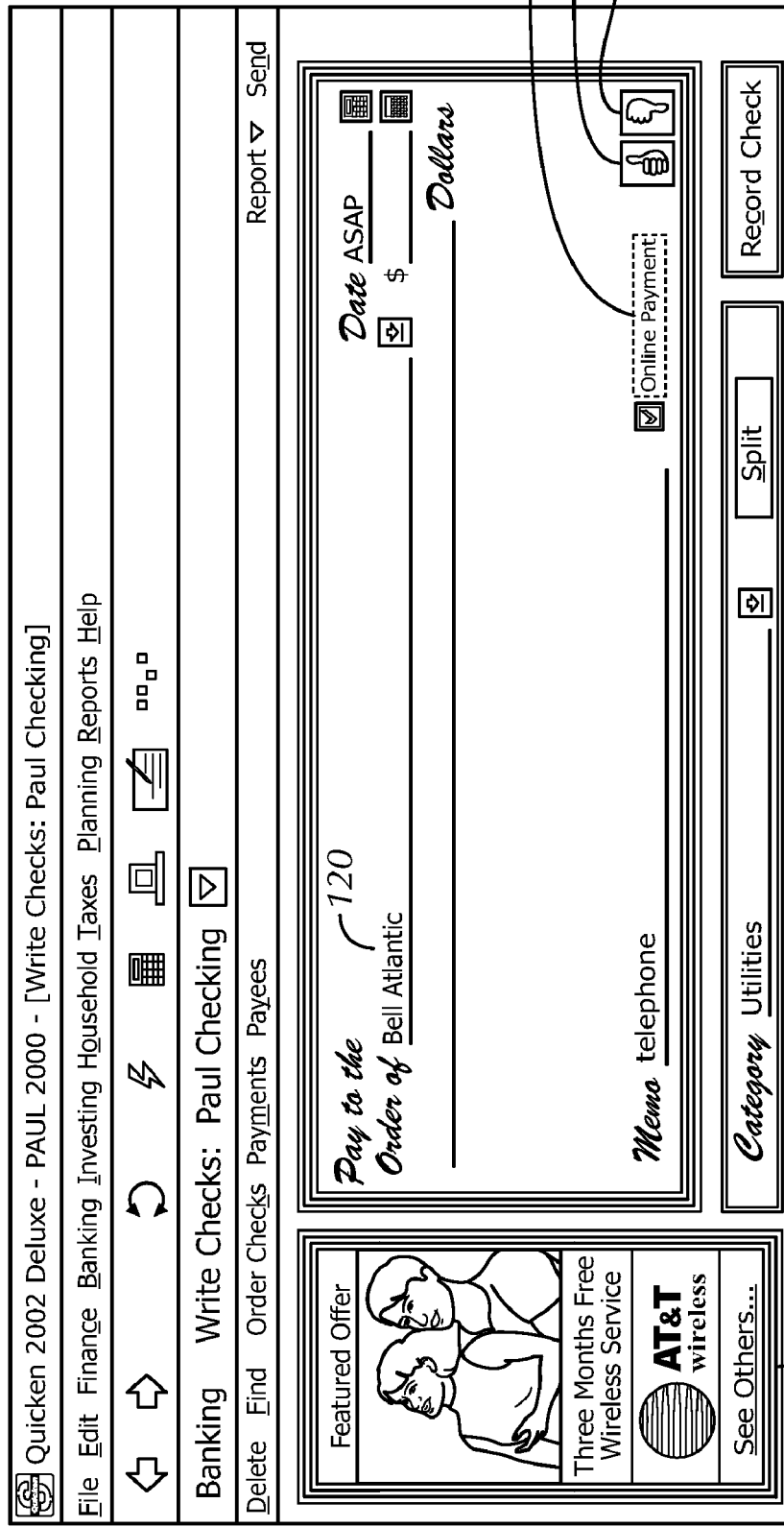
FIG. 2 depicts the user interface screen of FIG. 1, displaying information of an alternative vendor for a product.

As described in further detail below, in one embodiment of the invention, if the user clicks on the thumbs down icon, information 130 representative of alternative vendors will be displayed, as shown in FIG. 2. In either case (thumbs up or thumbs down), the user's response can be recorded and stored in a vendor database (described below) in correspondence with the vendor's name and other identifying information, thereby to generate a broad-based customer satisfaction rating system across all users of the system.

FIG. 2 illustrates the provision of additional information when the user clicks on the thumbs down icon 160 in the embodiment of FIG. 1. As in FIG. 1, window 110 provides a payee vendor field 120 in which to enter the name of the vendor to be paid, and the thumbs up and thumbs down icons 155 and 160. When the user clicks on the thumbs down icon, the system displays, in alternative vendor information window 130, information representative of an alternative to "Bell Atlantic"—in this instance, "AT&T". (Alternatively, the alternative vendor information window 130 can be always present, but "grayed-out" prior to activation.) As shown, both graphical and textual information representative of the alternative vendor can be provided.

In alternative embodiments, instead of a single vendor, a list of a number of alternative vendors, or alternative goods and services, can be provided. Moreover, in addition to identification of alternative vendor(s), additional information may be provided at this point, including pricing, details about special offers, advertising, hyperlinks to the vendor's web site, and any other desired information. The inclusion of hyperlinks to the vendor's site is particularly useful to assist the user in obtaining additional information on the vendor, or to switch services to the vendor.

FIG. 3 shows an alternative practice of the invention, which operates in conjunction with an online bill-paying, payment-recording, or financial management application such as that provided at www.quicken.com. In this example, a server hosting an online financial management system provides a webpage 300 as part of its interface (such as that provided at www.quicken.com). The user accesses the system using conventional browser software on a PC, wireless device, web appliance or similar device.

The user interface of FIG. 3 displays, among others, a bill-paying field 310, and a "send other payments" field 320. Within each field are multiple line items, each representing, for example, bills to be paid (or, in similar embodiments, prior payments to be recorded). Thus, the user can pay incoming bills by clicking on appropriate items in field 310, or send other payments in field 320. Each line item in each field has a provision for displaying a corresponding payee name, account number, delivery date, and payment amount. For example, the incoming bill from AT&T Wireless shows the payee name 325 and the payment amount 330. Associated with each line item are corresponding thumbs up and thumbs down icons, such as the icons 335 and 340 associated with the AT&T line item. In one practice of the invention, by selecting the thumbs down icon 340, the user provides a dissatisfaction rating to the system. In response, the system provides a list of alternate vendors for providing a service or goods similar to that of the vendor identified in the line item. It will be understood that each line item could also have an associated item designated "see alternative vendors" such that alternative vendor information could be provided without requiring or depending upon receipt of a user rating. It will also be understood that the organization and placement of fields in the user interfaces shown in FIGS. 1-3 are merely illustrative, and other examples are within the scope of the present invention.

In each of these examples, the user interface is configured to collect rating information from users, and display alternative vendor information to users, which may include alternative vendor identification, goods, services, prices, promotional offerings, advertising material, and the like. These aspects enable a broad-based rating system for users, and targeted advertising and marketing opportunities for vendors.

The ability to provide targeted advertising further supports various revenue models for the provider of the alternative vendor information (whether in a standalone application, or via an online application). The pricing of the display of alternative vendor information reflects the much higher relevancy and quality of the impression made by the alternative vendor information, since the information is being provided directly in the context of the user's financial behavior (such as bill payment at the POP). In particular, where the alternative vendor information is provided in response to a user's registration of dissatisfaction (e.g., clicking the thumbs down icon), the value of the impression is very high because the customer is at this moment most receptive to changing vendors. The inclusion of hyperlinks to the alternative vendor's site is a further basis for clickthrough revenue, particularly if this clickthrough again occurs in the context of the user's dissatisfaction with the original vendor.

Additionally, the fee for transmitting the alternative vendor impression can be based on known information about the user's relationship with the original vendor (i.e., the vendor listed in the line item). For example, the system can determine the length of time the user has been using the original vendor, based on the earliest date of a payment to the original vendor. As a result, alternative vendor impressions can be priced higher where the length of relationship has been long (i.e., over some predetermined length of time, such as 6 months), reflecting the greater desirability to the alternative vendor of dislodging the original vendor. As another example, the system can determine the total amount paid by the user to the original vendor, and again set a price based on this amount, reflecting the potential revenue to the alternative vendor from dislodging the original vendor. Additional revenue can also be derived from the switching process. For example, using minor variations of the methods described above, the administrator of the described system can charge a fee to the new vendor when the user signals his decision to switch to the new vendor. Such a switching fee could be either flat or progressive (i.e., based on the value of the goods or services to be provided by the new vendor). Additional advantages flow from the manner in which the customer rating information can be collected, stored, updated and accessed, as will next be described.

System Architecture

As explained below in connection with FIGS. 4-7, information representative of alternative vendors, goods and services can be obtained by accessing and searching a vendor database containing information including vendor identifiers, product and vendor categories, user ratings of vendors, goods and services offered, pricing, and the like. The database may be searched in accordance with current vendor name, category, and other parameters specified by the user during the bill-paying, payment-recording or financial management accessing session, by previously-expressed and stored transactional information and user preferences, or a combination of both, using conventional database access, search and retrieval methods. The database may be local, or remote and accessible via the Internet.

Conversely, information about particular users, and aggregated user information evidencing the buying and spending habits of groups of consumers, is collected, stored and made available on a dynamic basis using the architecture shown in FIGS. 4-7.

Figure 4:
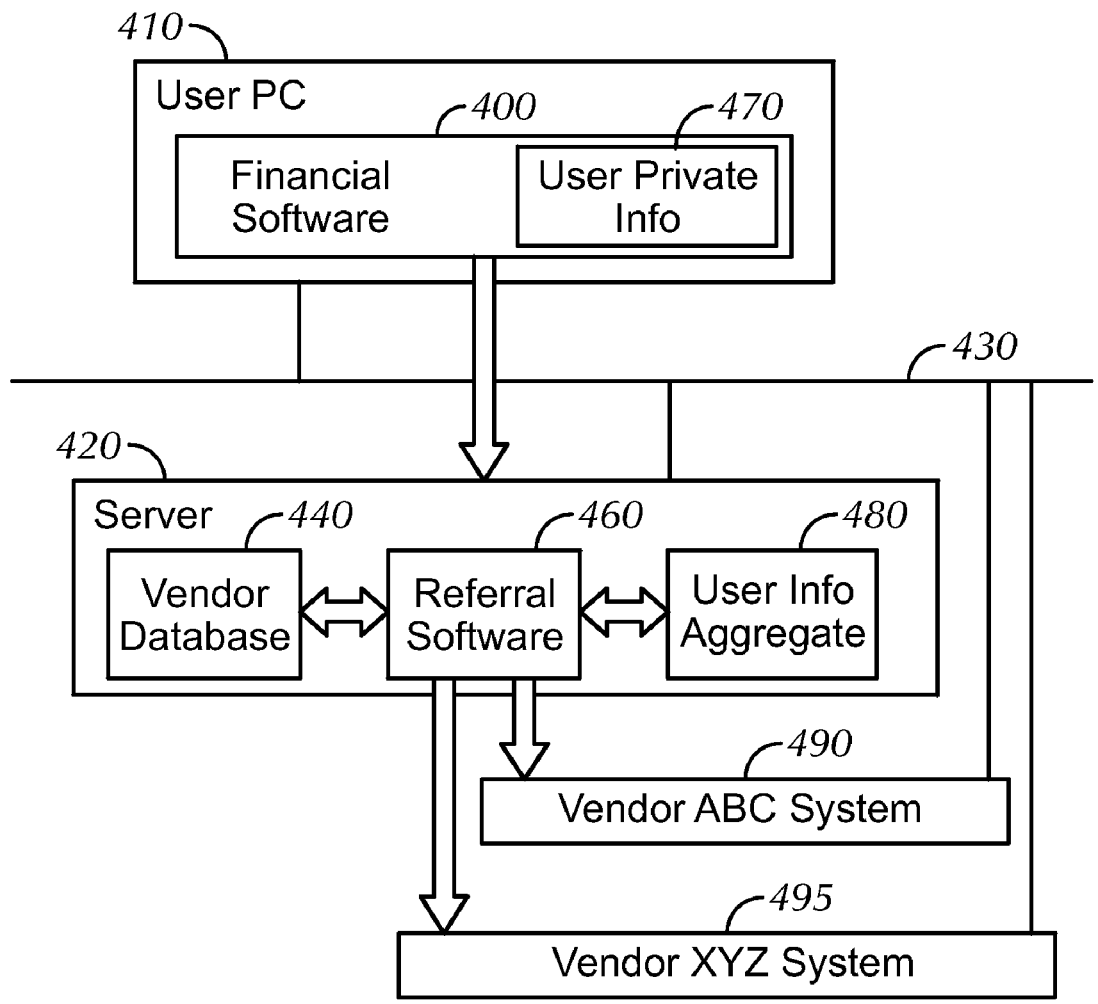
FIG. 4 depicts the architecture of one embodiment of the invention in which a user accesses a financial management system resident on his or her PC.

FIG. 4 is a block diagram depicting one embodiment of the present invention, in which financial software 400, such as Quicken® 2001 and QuickBooks® 2001, is installed on a user's PC 410. The PC 410 is capable of communication with a server 420 via the Internet 430, as enabled in a known manner by conventional communications elements and browser software on the user's PC. As shown, the server 420 includes a vendor database 440, referral software 460, and an aggregate user info database 480. As discussed in detail below, aggregate user info database 480, on server 420, and the user private information 470, on the user's PC 410, can be utilized to enable targeted advertising, and expedited, "one-click" vendor switchover, while protecting users' privacy. The implementation details common to e-commerce systems on the Internet, such as security systems, firewalls, database systems, account management systems, communication gateways, load balancers, and the like, are known to those of skill in the art, and not material to the invention, and thus have not been shown in FIGS. 4-7 to avoid obscuring the features of the invention. The user may employ various aspects of the financial software 400, all of which involve accessing information pertaining to vendors with whom the user does business. These operations include, but are not limited to:

- a check-writing session in which the user completes a check form to make a payment to a vendor, resulting in printed check to the vendor being created;
- an online payment session in which an online payment form is completed to make an online (e.g., electronic funds transfer) payment to the vendor;
- a register recording payments already made (whether by cash, check, credit card or EFT);
- a report generation session in which the user generates payee reports, spending reports, and the like that contain summaries of payments to one or more vendors;
- a payee list access session in which the user accesses a stored list of payees, to either add, edit, or delete such payees.

For example, during a check writing session, the financial software 400 may cause the generation of a user interface display like that shown in FIGS. 1 and 2, or any other display appropriate to the user's commands. In the illustrated embodiment, if the user clicks on the "thumbs down" icon, the financial software activates a conventional browser module to activate a connection to the Internet. The client PC 410 then transmits a TCP/IP request to the server 420 to connect with the referral software 460. As part of the request or subsequent thereto, the client PC 410 transmits to the server the name 120 of the payee specified on the check to be written or bill to be paid. The payee name could also be obtained from the payee list stored by the financial software 400—i.e., the list of vendors to whom the user had previously made payments. Similarly, information representative of the product or category of the product could be obtained and encoded in the request. The referral software 460 receives the request and parses the information therein. The referral software 460 then accesses the vendor database 440 and searches in accordance with the vendor name, category, and/or other parameters specified by the user before or during the duration of the financial management session. The referral software 460 obtains some set of alternative vendor information, which it then appropriately formats (e.g., in HTML or other format) and provides the vendor information to the server to transmit to the user's PC 410. The user can then select an alternative vendor and, if desired, can immediately switch over to service or goods from that vendor, as discussed below. The referral software 460 will also log information identifying the information transmitted, to provide for auditing and revenue collection from the alternative vendors. These functions are further discussed in connection with FIGS. 8-11.

In an alternative embodiment, alternative vendor, goods or services information is transmitted automatically, regardless of whether the user has indicated dissatisfaction with the specified vendor, goods or services. In this embodiment, after the user has entered a payee name 120 in the appropriate form field, the financial software 400 automatically generates and transmits the request to the referral software 460, which responds as above. This process can occur automatically and transparently. In a variant of this system, the user is given the choice in the financial software 400 to select whether or not to receive such automatic information.

The system can also be configured to provide information about alternative vendors upon receiving the user's satisfaction rating (or other user rating, such as cost, timeliness or the like) for the current vendor.

If desired, instead of a binary, thumbs up/thumbs down rating, the system could enable users to provide a rating on a scale, such as from 1-10, or A-F. In such a case, the system could provide information about alternative vendors when the rating is below a certain threshold level; or could provide information of alternate vendors that provide the same (or similar) product, but with higher user ratings than the current vendor. In this variation, the referral software 460 operates as before, but takes into account a stored aggregate rating of the current vendor, so as to select only alternative vendors with a higher aggregate rating. For example, if the current vendor has an aggregate rating (based on ratings from many users) of 7.5 (on a 1-10 scale), then the referral software 460 can limit its search to vendors with an aggregate rating greater than 7.5. Users may optionally specify other user preferences for providing alternate vendors, such as location, small-business orientation, minority-owned, environmentally conscious, or any other criteria, which the referral software 460 would similarly use to constrain its search. Similarly, the referral software 460 may constrain its search based on other factors known about the current vendor, such as its location (to pick alternative vendors near the user), or its pricing (to pick vendors with comparable pricing), without requiring a direct input or selection by the user.

System Databases

When a user employs the system to provide an indication of satisfaction or dissatisfaction, whether at the POP or any other point in a financial management, bill-paying or payment-recording session, the referral software 460 at the server updates the vendor database 440 with that information. The updated information includes an update to the vendor's aggregate rating(s), by factoring in the user's current rating.

The stored vendor ratings can also be used to provide feedback to vendors. In one embodiment, any negative (e.g., thumbs down) rating is used to generate a message that is immediately transmitted to the vendor. The system accesses the vendor database, retrieves the e-mail address of the vendor, which can be stored with the vendor's record in the database, and transmits a message, including rating, to the vendor. At the user's election, this message can identify the user or not, thereby enabling the option of permitting the vendor to contact the user to resolve the user's concerns. Alternatively, updates to the vendor's aggregate rating can be transmitted. In one such embodiment, only updates that result in a particular degree of change in the aggregate rating are transmitted to the vendor. For example, when the vendor's rating changes by a threshold percentage amount, or a threshold scalar amount (e.g., +/−0.5 points), the rating change can be e-mailed to the vendor. In addition, the change in rating can be correlated with statistical information about geographic locations, thereby informing the vendor as to the areas in which it is doing better or worse than previously. In such a case, the system would correlate (1) the location of the user (assuming such information is collected either upon enrollment or during transactions or other sessions) retrieved from the user info aggregate database 480, with (2) the rating, and then update the vendor database 440 with the location-correlated rating.

The ratings and other feedback can be stored in the vendor database together with information about each vendor's product and service offerings, pricing, local, regional or national coverage, and any other information provided by the vendor, through input from user transactions, or from public sources. Consumers can access the vendor database 440, either by clicking "thumbs down" or otherwise, to view ratings, goods and services offerings, pricing, and other vendor-specific information. A fee can be requested, and the vendors can pay, to be featured at this or other levels of information retrieval. For example, a vendor having high consumer ratings could pay for a broadcast to all users who are paying for a given product (or a product of the vendor's competitor) of the query "Would you like to see the highest-rated (or higher-rated) vendors for this product?"

The vendor database may be populated initially by vendor records created from telephone listings and similar public sources. Alternatively, vendors can pay to be registered therein. The administrator of the database can optionally undertake to investigate the quality of each vendor prior to registration and thereafter. These features could represent a significant source of value for both consumers and vendors, and a source of revenue for the entity administering the database.

The vendor database can be updated to add ratings data for vendors already in the database, or to add vendors when users make or record payments to vendors not already listed. Referring again to FIG. 4, when a vendor payee is specified in a bill-paying, payment-recording or other financial management session, the referral software 460 searches the vendor database to determine whether there is a vendor record for that vendor. If no vendor record exists (i.e., the vendor is not listed in the database), the referral software 460 adds the vendor to the database. The referral software 460 preferably flags the new entry to allow the entry of further relevant information, including vendor identification, type or category of the vendor, goods or services, and the vendor's geographical location. The aggregate rating for the vendor will then be updated each time the vendor is paid in future transactions.

In this embodiment of the invention, an aggregate rating is stored for each vendor in the vendor database. Many alternatives are available for calculating these values. For example, the aggregate rating can be a simple mean, wherein the system calculates an average of all ratings, of whatever age, and then re-calculates each time a new rating is received. Alternatively, the rating can be a weighted average, with exponential time-decay of older, presumably less-relevant, ratings. Ratings can also be assigned subclasses based on geography, product, price-range, or a host of other parameters. In each instance, relevant information can be stored in the vendor record in the vendor database, and updated and re-calculated upon receipt of new information from users.

Where appropriate and permitted by applicable law, collection of information about users' locations, spending history and the like can also be implemented, using well-known techniques, with safeguards to protect user privacy. For example, in one embodiment of the invention, a user's e-mail address can be collected and used to generate a user ID. This ID can be used to correlate (e.g., used as a storage index to) information about the user's location, products purchased, alternative vendor preferences, and other consumer information, in the user info aggregate database 480. This information could be updated each time the user performs a transaction, makes a payment, or otherwise uses the system. This database would thereby contain, and enable vendors to access, aggregated consumer information representative of products purchased, demographic patterns and the like. Vendors could then use this information to enable targeted marketing and advertising. Consumer information destined for database 480 can be rendered anonymous by removing references to the user's name, address, telephone number, social security number or other personal information. Other privacy measures may be appropriate or required by applicable law.

Referring again to FIG. 4, the user's private account information, such as name, address, telephone number, billing account numbers, and the like, are stored in the user private info database 470 in PC 410. The information contained in the vendor and user databases can be employed to enable users to request alternative vendors according to user preferences, which may be based on geographic, demographic, minority-based, environmental, or any other criteria.

In addition, the private user information can be used to facilitate switching vendors, as directed by the user in response to one or more alternative vendors displayed by the system. Thus, when the user is viewing alternative vendor information, he or she can signal that he or she wishes an immediate switchover from the current vendor to the "new" alternative vendor. In this case, the user's private information is transmitted from the user private info database 470 to the alternative vendor's system 495, so that the alternative vendor can then establish an account for the user and arrange for termination of service from the current vendor. As needed, the alternative vendor can engage in the appropriate protocols and procedures to ensure that the user has in fact authorized the switchover, in order to avoid issues of "slamming" (unauthorized switching of providers).

Where appropriate and permitted by applicable law, vendors will be allowed access only to aggregated consumer information, devoid of personal or private user information. The user's private information, such as name, address and social security number, will be provided only when the user requests a vendor switchover, and when permitted or required by applicable law.

In addition to paying for registration in the vendor database, vendors can purchase other forms of preferential treatment. A vendor can pay to target specific geographical, demographic or other markets, or categories of consumers, such as those who spend more than a selected amount each month or those having an income in excess of a selected amount, or for preferential placement as a featured vendor when an alternate vendor is requested. Featured vendor alternatives will be displayed to users before the display of other alternative vendors, thereby increasing the chance that consumers will select and switch to the featured vendors. This may be implemented by adding a field to the featured vendor's database record indicating that the vendor's information is to be given preference when retrieved and delivered to a user. Featured vendors can also enjoy a further information distribution feature, such that when alternatives are requested, the system will open a window on the user's display and send not only information about the featured vendor, but also the vendor's designated web page, based on a URL stored in the vendor database.

In addition, a vendor can pay a fee to target consumers who are using the vendor's competitors, and can then offer discounts to such users as an inducement to switch. In addition, a vendor can purchase a keyword to use to target particular users. For example, a company could purchase the keyword "toy", and the system would be configured to transmit promotional material from that vendor to every user whose payments contain a field whose argument is "toy".

Other Embodiments

Figure 5:
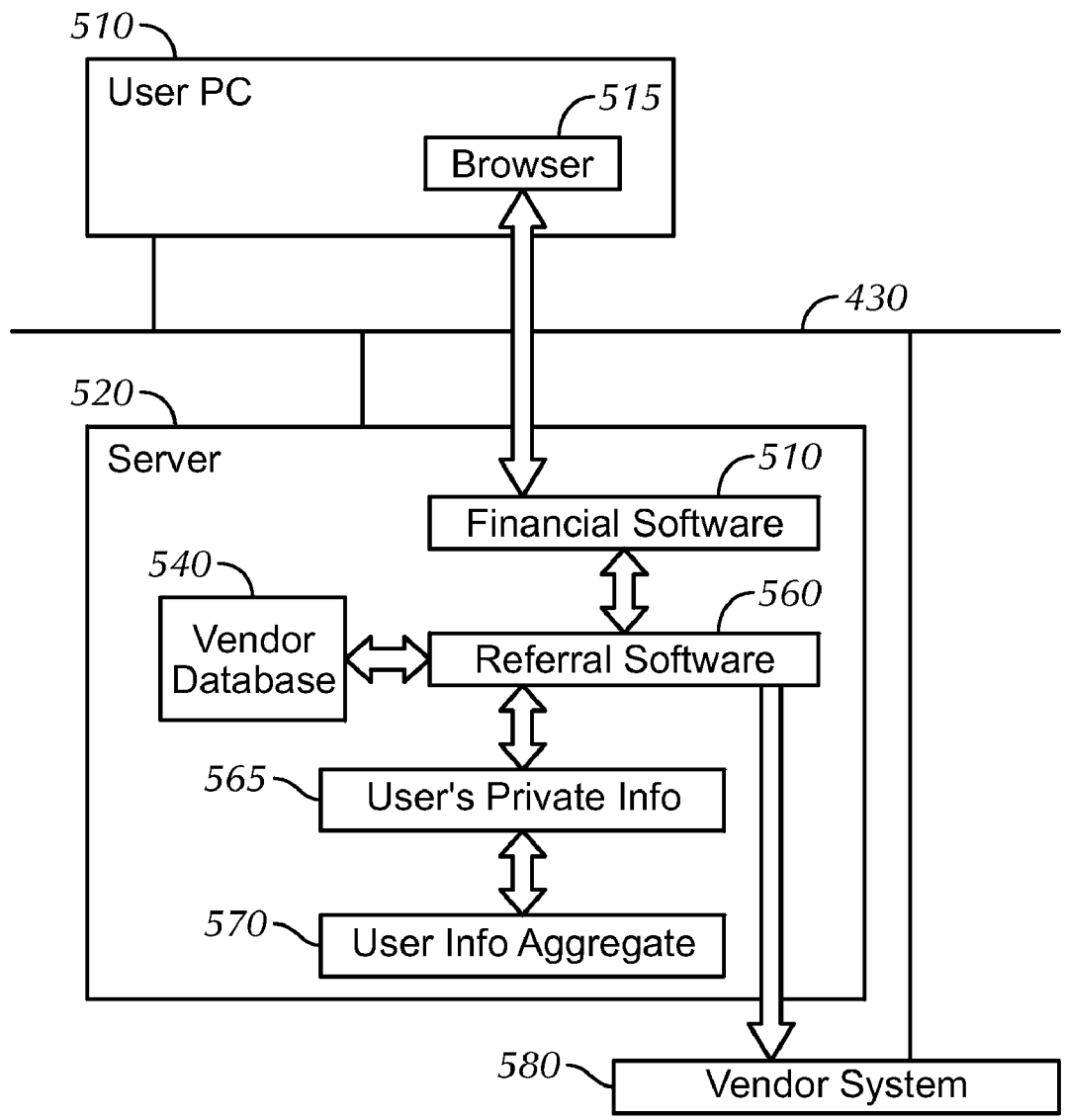
FIG. 5 depicts another embodiment of the invention in which a user accesses an online financial management system via the Internet.

FIG. 5 is a block diagram of another embodiment of the invention, in which the user accesses an online financial management system. A user on a local PC or other device 510 is connected to server 520 via the Internet 430 by means of a conventional browser utility 515. Those skilled in the art will appreciate that such communication can be provided in a known manner using a modem and/or other conventional communications devices not shown in FIG. 5. Multiple users can access the financial software 510, and referral software 560 on server 520, to obtain the functionality of the present invention.

When a user enters a check-writing or bill-paying session, or accesses the financial management system to examine or analyze previous transactions, he or she can indicate satisfaction or dissatisfaction with vendors, goods or services, and can obtain information representative of alternative vendors, goods and services, in substantially the same manner discussed in connection with FIGS. 1-4 above. Financial software 510 will invoke information management application 560 and, where required, forward appropriate user information to enable vendor switchover. In the illustrated embodiment, private user account information 565 is stored on server 520, as is aggregate user info database 570 and vendor database 540. In the event of vendor switchover, appropriate commands and information can be transferred from the referral software 560 to the vendor system 580 in the manner described above in connection with FIG. 4.

Figure 6:
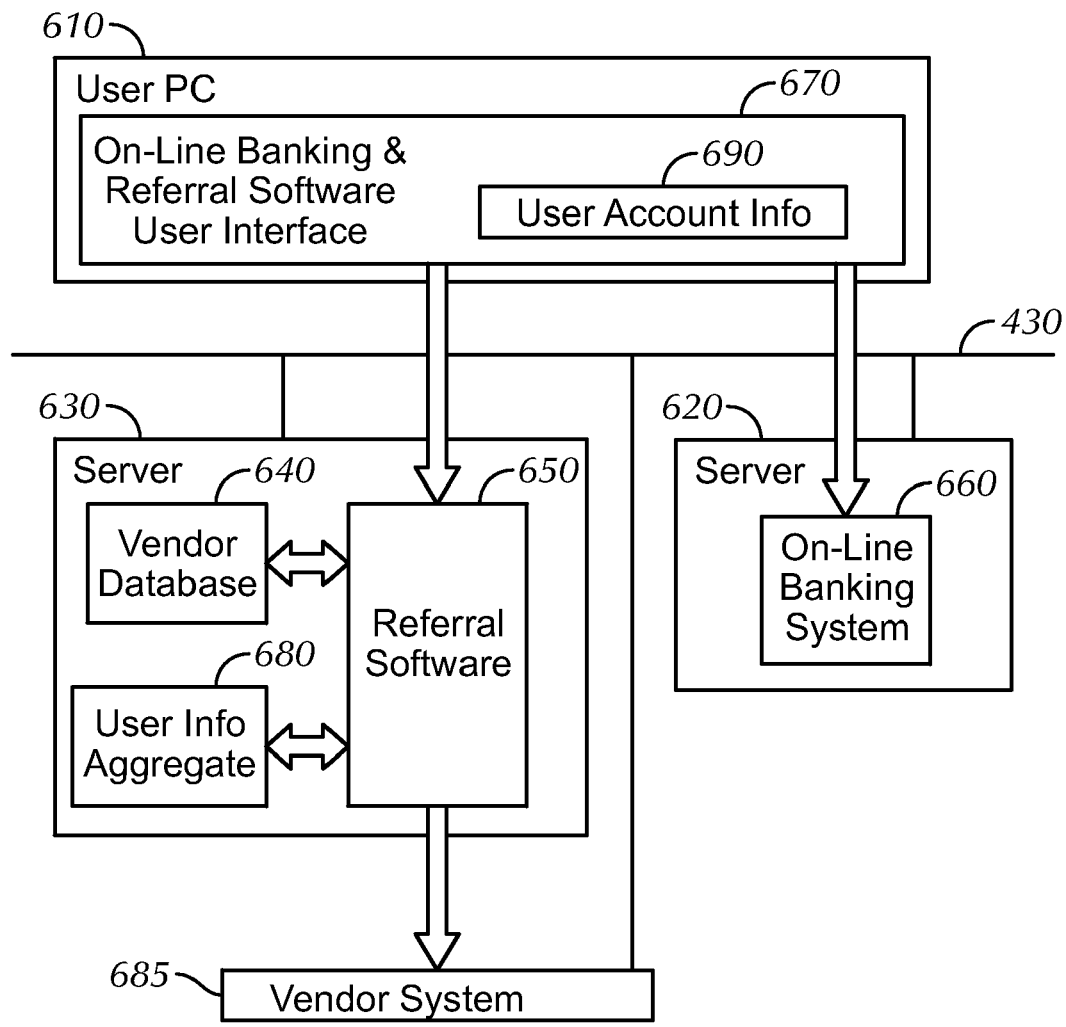
FIG. 6 depicts a further embodiment of the invention in which the user can access an online banking system on a first server, while obtaining alternative vendor and other information from a second server.

FIG. 6 depicts an online banking embodiment of the invention, in which a user employs a PC or other device 610 to communicate with server 620 via a conventional connection to the Internet, and thus use wvw.quicken.com or other online banking system 660 (see also FIG. 3). As shown, another server module 630 can be used to maintain a vendor database 640 and vendor comparison and switching application 650 like those described above. PC 610 can include an interface module 670 that enables interaction with the vendor comparison and switching application 650 in accordance with the invention, and personal user account information 690 can be stored at the client device 610.

Figure 7:
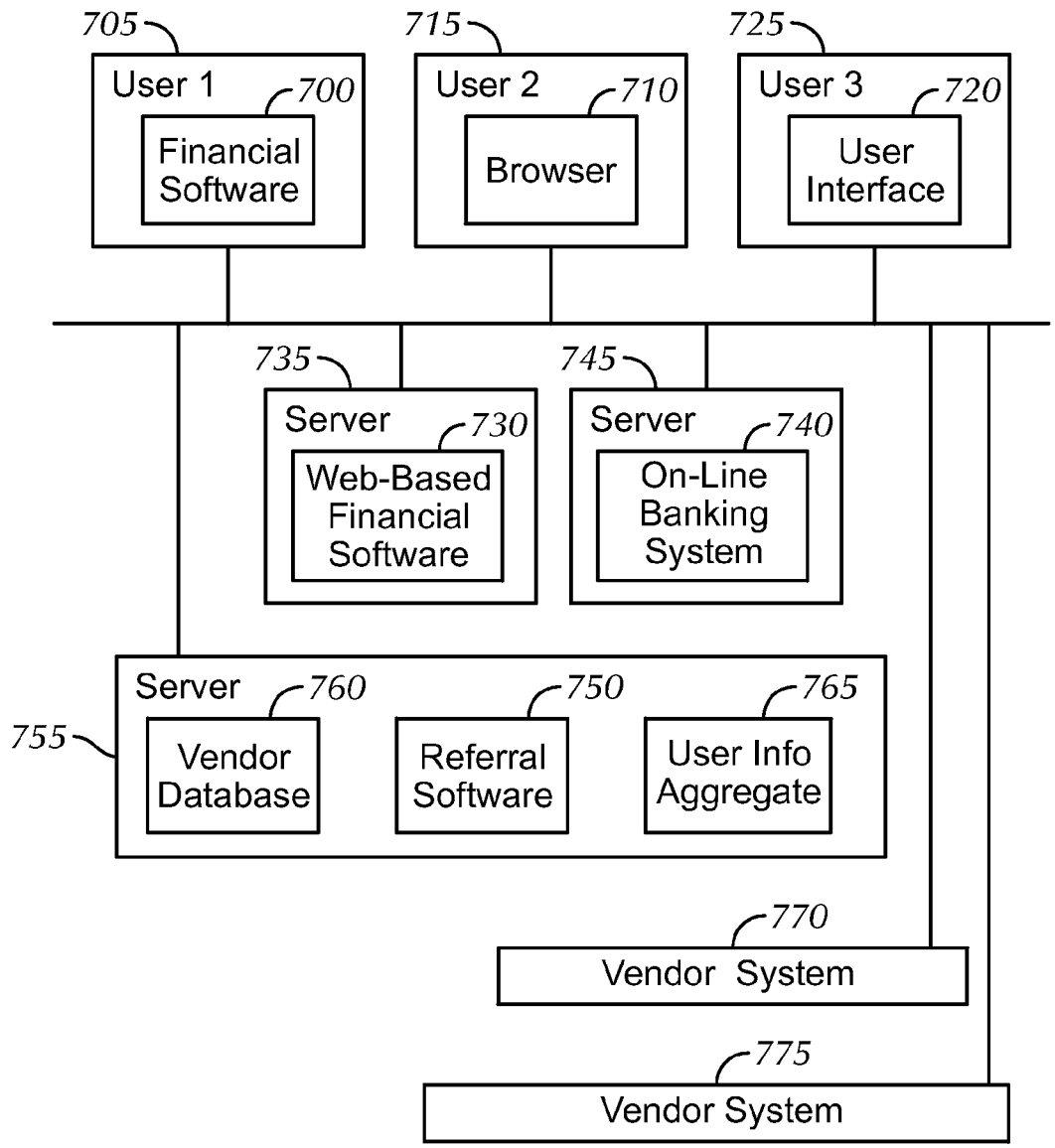
FIG. 7 is a block diagram of still another embodiment of the invention, with simultaneous, distributed operation of the systems depicted in FIGS. 4-6.

FIG. 7 is a block diagram depicting distributed, multi-user aspects of the invention, in which multiple communications, storage and processing architectures, such as those illustrated in FIGS. 4, 5 and 6, can be simultaneously supported. As shown in FIG. 7, User 1 can utilize financial software 700 on PC 705. User 2 can access Web-based financial software 730 on server 735 via the Internet, by using conventional browser 710 on PC 15. User 3 can access on-line banking system 740 on server 745, via a browser or a direct dial-up interface 720 on computer 725. In each case, the information collection, display, storage, update and retrieval functions described above can be provided. Thus, for example, Users 1, 2 and 3 can each automatically receive information representative of alternative vendors, goods or services at a selected point in the bill-paying (or other financial management) session, which may be upon clicking on a "thumbs-down" icon. In each bill-paying transaction and vendor switchover event, the vendor database 760 and the user info aggregate database 765 will be updated accordingly. One-click vendor switching can also be provided, via the processes described above, including access to vendor systems 770 and/or 775. The illustrated embodiment can also be utilized via a PC, wireless telephone, PDA, web appliance or the like.

The foregoing demonstrates that the present invention can be implemented in various configurations. For example, as shown in FIG. 7, private user information can be stored on a user's local processor, and the local processor can be used to access the vendor comparison and switching facilities via the Internet. Another user might access all system facilities using only a wireless device and a browser, with all user account and vendor information being server-based. Another user may employ otherwise conventional financial software on a local PC, receiving information about alternative vendors, goods and services only when requested, or automatically when specifying a payee or at another point in a bill-paying, payment-recording or other financial management session.

In each case, the noted system functions, which permit users to enter ratings (whether of satisfaction, quality, cost, timeliness or other), obtain alternative vendor information, receive targeted advertising, and change vendors with one click, are provided by the invention. Vendors can pay to register with the system, and can also pay for preferential treatment and targeted advertising.

While the invention has been described above in terms of the Internet, and client/server architectures, it will be understood that other forms of communications channels and processors can be employed to implement the invention.

Method Aspects

Figure 8:
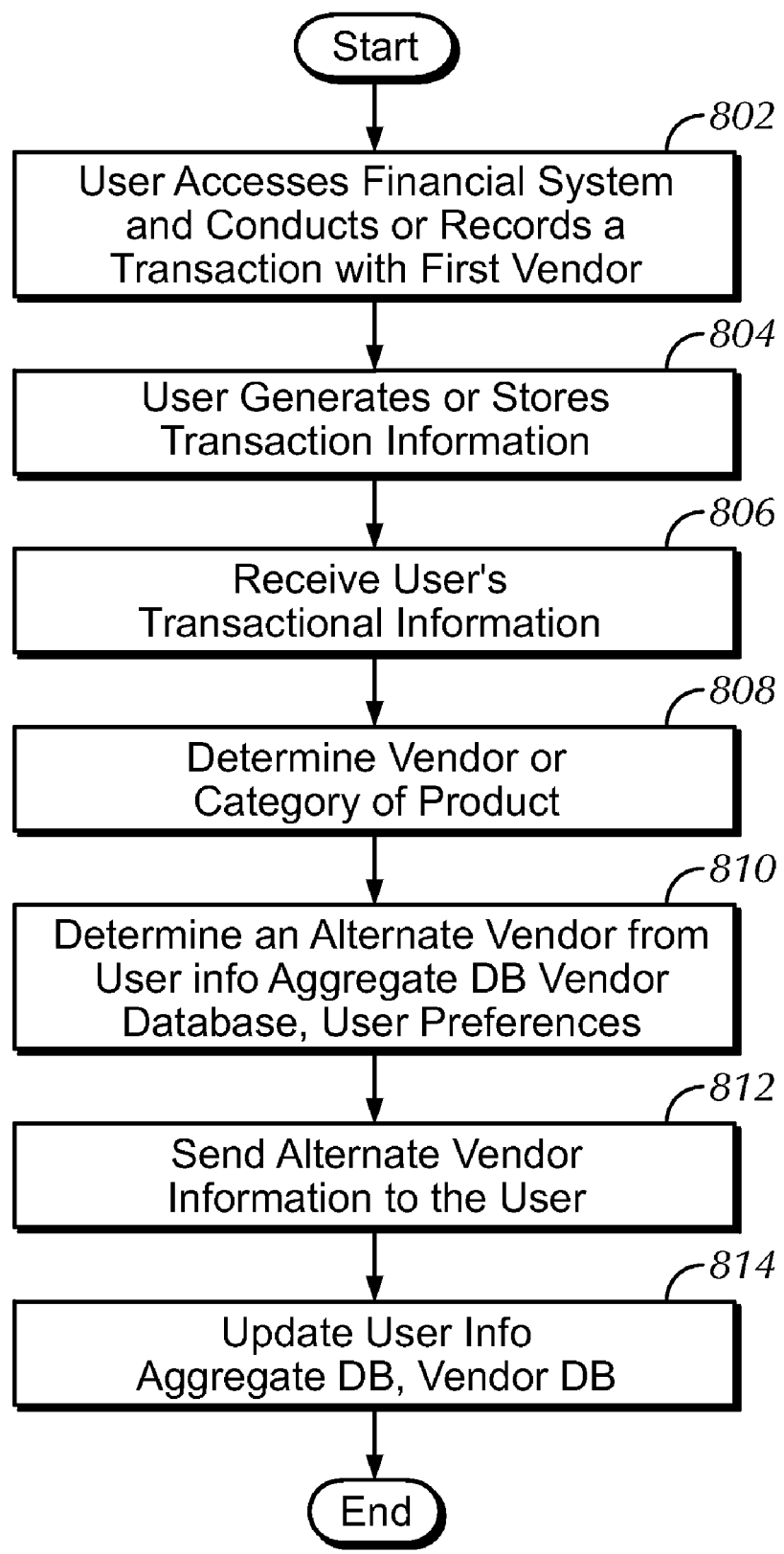
FIG. 8 is a flowchart depicting a method of automatically providing information about alternatives.

Automatic Display of Alternatives: FIG. 8 depicts a method wherein information about alternatives is provided to users automatically, without requiring the user's rating or indication of dissatisfaction. As shown therein, a user activates 802 a financial management system such as PC-based Quicken, or online software from www.quicken.com via the Internet. The user employs the financial software to initiate a bill-paying, check-writing, payment recording, or other financial management session, which may be either local (e.g., local check-writing via Quicken) or online (e.g., online banking via www.quicken.com). The user may also use the financial management system to examine and analyze previous transactions and payees, or to obtain a summary of previous transactions.

The user generates 804 transaction information, including information about a product or a vendor. Such information may be generated in the bill-paying, payment recording or other financial management session (such as when the user accesses a payee list). In addition to information entered by the user in a current session, the financial software can store information about previous vendors and transactions, including the user's account numbers (subject to the privacy concerns noted herein), vendor addresses, categories of products, goods or services purchased, amounts of previous payments, and the like.

This information is received or obtained 806 by the system of the present invention. The system can obtain 806 the user's personal information, such as name, address and social security number. To protect user privacy, the user's bill-paying history and transaction records can be "anonymized" prior to storage in a database, by removing or disassociating from such records the user's name, social security number, e-mail address and other personal information, and replacing such information with a system-generated, secret, anonymous, unique ID.

The system determines 808 the current vendor or product (i.e., the identity or category of the vendor and/or product involved in the current bill paying, payment recording or other financial management session). This information is determined by examining the transaction information supplied by the user or previously stored by the system, as in a payee list. For example, in the check-writing session depicted in FIGS. 1 and 2, there is shown a payee "Bell Atlantic", a category "Utilities" and a memo indicating "Telephone".

In addition to making this determination based solely on the information provided, the system can supplement it by searching the databases described above, using as search terms the information provided. In the example of FIGS. 1 and 2, the system can search its databases to determine products or services provided by "Bell Atlantic", with further searches enabled by the terms "Utilities" and "Telephone".

Next, the system determines 810 alternative vendors (or products), based on information provided by the user, or previously stored and now accessed, and other information developed. In addition to transaction information (including vendor or product identity, category or geographical location), user information can also be used to obtain information about alternatives. For example, based on a geographical proximity rule, the user's geographic location, coupled with information about vendors' geographical locations, can be a basis for obtaining alternative vendor information. Other rules and comparisons can be utilized, and are well within the level of skill of implementers of the invention.

Users can also state and record preferences to be used in selecting alternative vendors, goods or services. For example, a user can specify preferences based on geographic location (e.g., location identical or similar to the user's), minority-owned, or environmentally-conscious vendors, or any other useful factors. This information is stored by the financial software 400 or other appropriate application as discussed above. As noted above, vendors can pay for preferential treatment, such as the privilege of going to the top of an alternative vendor list for a specified commodity, as an alternate for a designated vendor, and the like.

Next, the information about alternatives is provided 812 to the user, and may be displayed as described above. Thus, in the method of FIG. 8, information about alternatives is provided to the user in each transaction, payment recording or other financial management session, without the requiring the user's rating of the vendor or product.

Finally, the system updates 814 the user info aggregate database with the information from the user's current transaction, payment recording or financial management session. For example, if a user is conducting a transaction with a new vendor, the new vendor's name will be added to the user's record. The vendor database may also be updated. For example, if the user indicates that the current vendor is providing a product that is not currently in the database, the system will update the current vendor's record.

Figure 9:
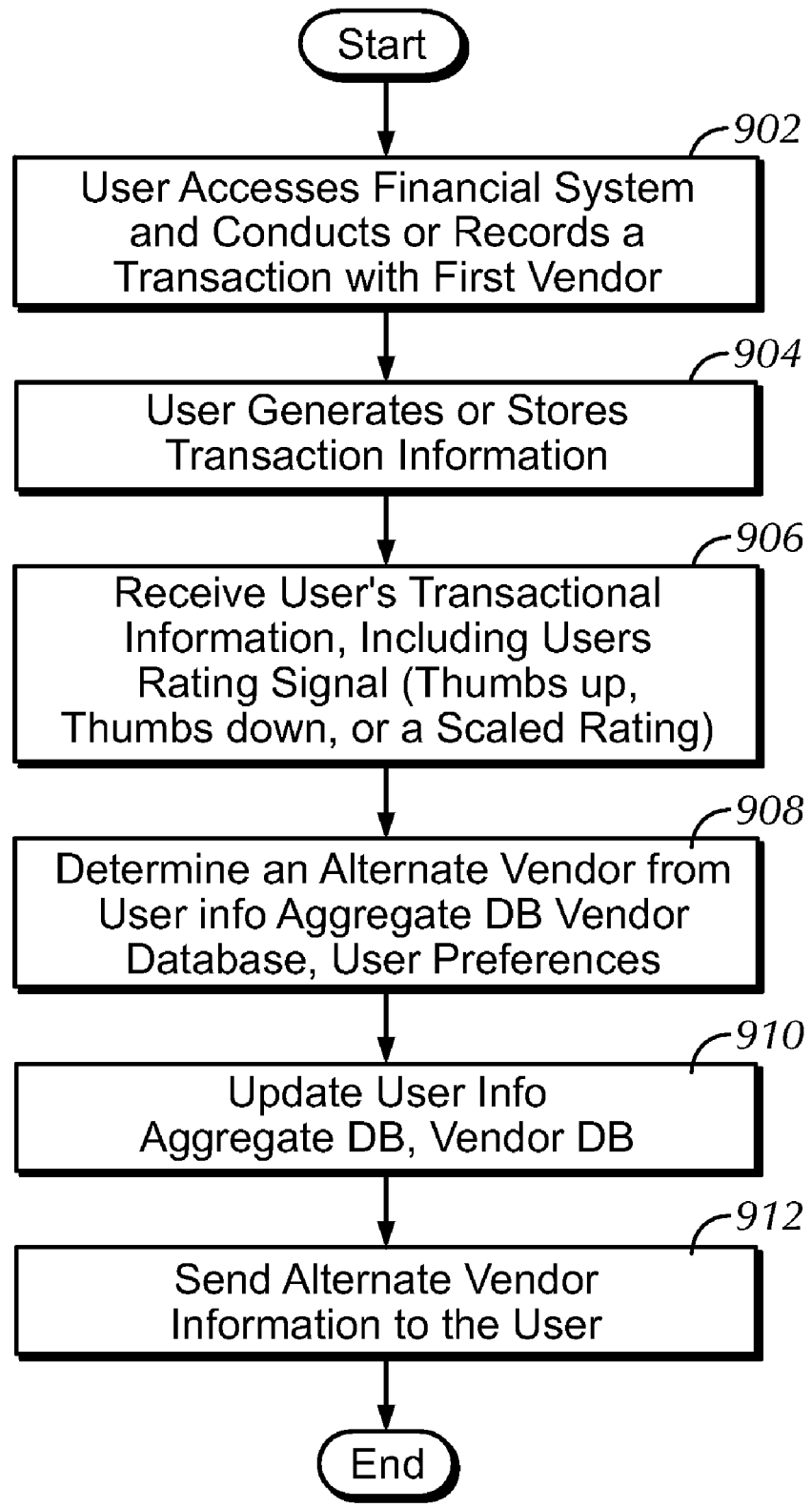
FIG. 9 is a flowchart depicting a method of providing information about alternatives, based on a user rating signal.

Display of Alternatives Upon Rating: FIG. 9 shows another method of the invention, in which information about alternatives is transmitted after the user signals dissatisfaction with the current vendor. As shown therein, the user accesses the financial management system at 902.

At 904, transaction and other information is generated, stored or accessed. For example, the user, while making or recording a payment or otherwise accessing the financial management system (such as by using the graphical user interface depicted in FIGS. 1 and 2), may enter data into the payee portion of a check, or otherwise designate a payment, and may also designate a payee category. Once the payee name is entered, buttons, menus or other UI features are enabled to permit the user to provide a rating.

In one example, once the user has entered a payee, a rating icon such as thumbs up/thumbs down is enabled. The user can then click to rate the vendor or product. In an alternate embodiment, the system can prompt the user by displaying a dialog box saying "Please rate this vendor: [up] [down]". Other indicators can be employed, including numerical (e.g., 1-10) or letter-grade (A-F).

At 906, transaction information (including rating information) is received. Upon receipt of rating information, the system obtains information about alternatives (908), updates databases (910), and provides to the user the information about alternatives (912) in accordance with the techniques described above.

Thus, in FIG. 9, information about alternatives can be obtained in response to detection of a "thumbs down" indication. Alternatively, in a system utilizing a scaled rating system, such as 1-10 or A-F, information about alternatives can be provided if the rating falls below a certain threshold, if higher-rated vendors or products exist, if relevant new vendors or products are available, or based on any of a number of parameters relating to user, product and vendor information.

Figure 10:
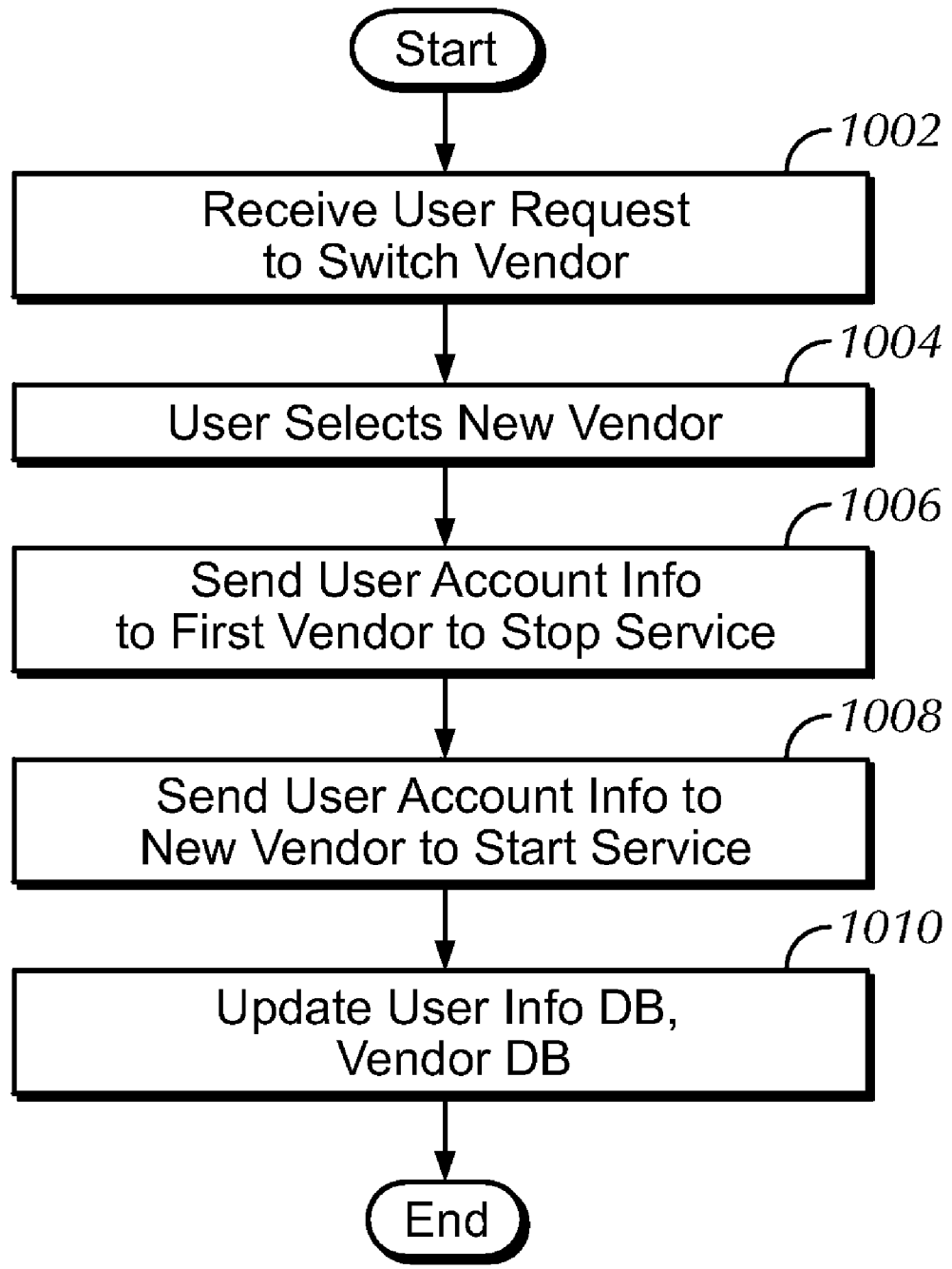
FIG. 10 is a flowchart depicting a "one-click vendor switch" aspect of the invention.

Vendor Switching: FIG. 10 depicts a method of enabling users to rapidly and efficiently switch vendors, i.e., from a "current" vendor with which the user may be dissatisfied, to a "new" vendor. The method depicted therein assumes that the user has already accessed the financial management system, and performed a transaction (or recorded a payment or otherwise conducted a financial management session), in accordance with the methods described above.

At 1002, the user is presented with information about an alternative vendor, either automatically, or upon provision of a user rating, as described above in connection with FIGS. 8 and 9. (In another embodiment, the user can be presented with a list of alternative vendors, either automatically or upon request, from which a selection of new vendor may be made.)

Next, at 1004, the user selects the new vendor, typically by clicking on an icon designating the new vendor, supplied with the information about alternatives at 1002, or by otherwise signaling the selection of the new vendor.

In response to the selection of a new vendor, at 1006 the system obtains user account information, using the techniques described above, and transmits necessary account information to the current vendor with a request to terminate service. As noted above, appropriate and required safeguards should be utilized to preserve user privacy.

Concomitantly, at 1008, the system transmits, to the new vendor, user account information necessary to effectuate a switchover, along with a request to initiate service.

Thus, using the example of FIGS. 1 and 2, if the user is dissatisfied with long-distance provider Bell Atlantic, the user will indicate thumbs down in a bill-paying or other financial management session, and will receive information about alternative vendor AT&T Wireless (FIG. 2). If the user clicks on the appropriate icon and indicates a request to switch to AT&T Wireless, the user's name, telephone number and other necessary information will be sent to Bell Atlantic with a "stop service" request, and to AT&T Wireless with a "start service" request. AT&T Wireless can complete the switchover upon receipt of the information, in a manner analogous to, but without the pejorative effect of, the known practice of telecommunications "slamming". Alternatively, AT&T Wireless can contact the user directly after receiving the information, to complete the switchover.

This switchover process is the converse of the known (and widely-criticized) practice of "slamming." The invention places the process entirely under the control of the consumer, rather than the providers, and thus places the power to switch vendors in the hands of consumers.

Referring again to FIG. 10, the vendor database and the user info aggregate database are then updated (1010) to record the fact that the user switched vendors. Further detail about information collection and update is provided above and in FIG. 11.

Figure 11:
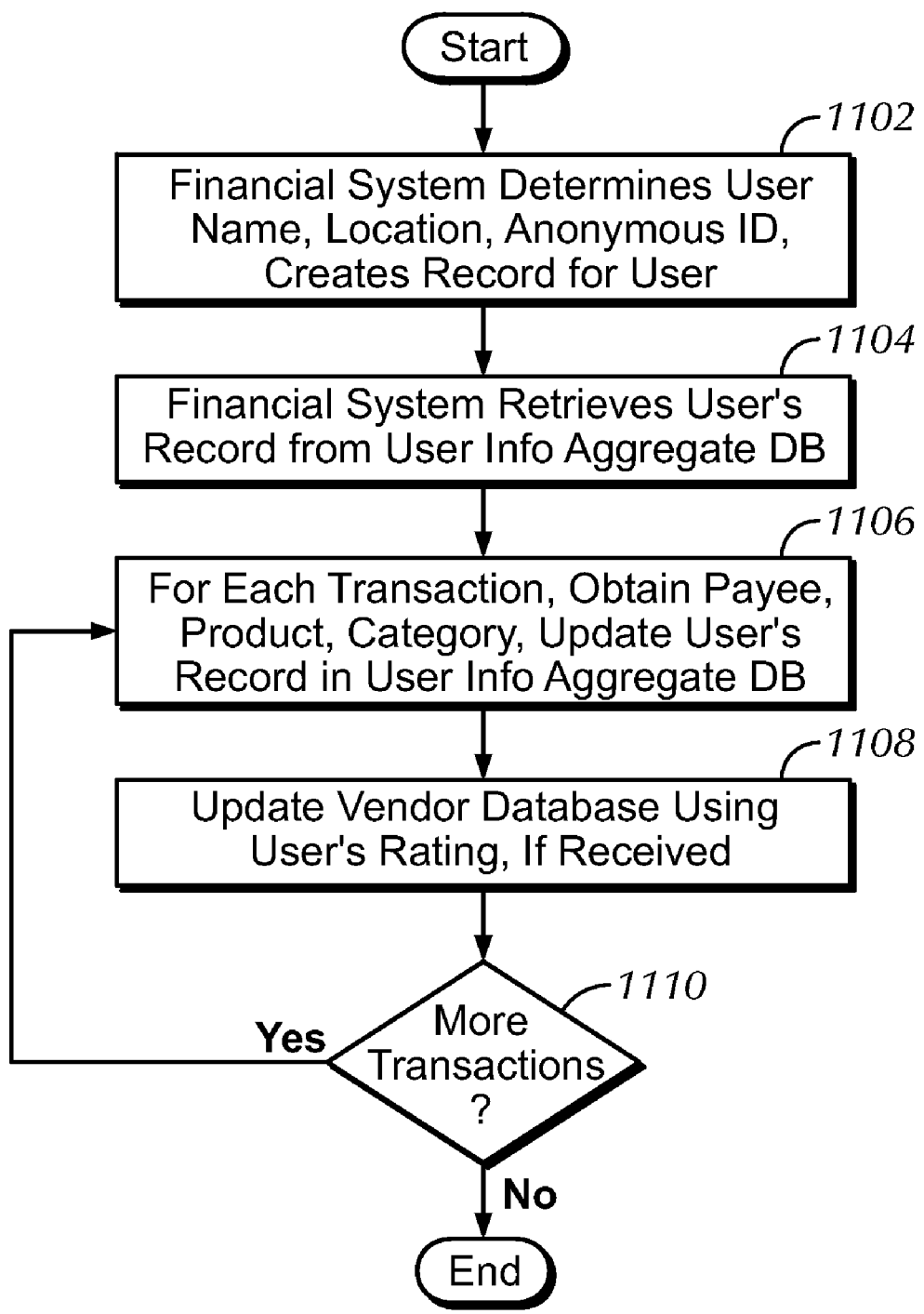
FIG. 11 is a flowchart depicting processes for updating information in accordance with the invention.

Information Collection/Update: FIG. 11 depicts a method of collecting and updating information for the user info aggregate database and vendor database. As shown therein, when a user first accesses the referral system of the present invention, a user record is created in the user info aggregate database (1102). The user is assigned a unique, anonymous ID number, which may be randomly assigned or based on any known technique of assigning secure ID numbers. Information available to the system, which may be provided by the user in response to system queries or in the course of a transaction, (e.g., the user's address or geographical location, transaction information and the like) will also be stored in the record. The user may also be queried to obtain vendor preferences, such as environmentally conscious vendors, and the like.

Similarly, at 1104, a vendor record can be created for each vendor involved in a transaction in the system, and stored in the vendor database. Vendor records can include information about vendor identity, location, ratings, frequency of consumer switches to and from the vendor, and the like.

At 1106 and 1108, each time a user processes a transaction, pays a bill online, records a payment, or otherwise modifies a payee list in the financial management system, the system can update both the user record and the vendor record. At 1106, the user record is updated to show that the user has purchased a product or item from the vendor, and at 1108, the vendor record is updated to reflect a purchase, change the rating, or record a switch. Thus, whenever a payment is made or recorded, or a financial management system otherwise accessed, updates can be made to the user info aggregate database and vendor database. These databases can be used to provide information regarding users' ratings for vendors and products, along with other information such as location, spending history, and income levels; and can be updated constantly as users make or record payments through the system.

The foregoing discloses exemplary methods and embodiments of the present invention. It will be understood that the invention may be embodied in other forms and variations without departing from the spirit or scope of the invention. Accordingly, this disclosure of the present invention is illustrative, but not limiting, of the invention, the scope of which is defined by the following claims.

I claim:

1. A method for switching vendors comprising:
sending, using a processor of a computer, an invitation to a user to rate a first vendor in response to the user designating the first vendor as a payee while paying a bill from the first vendor using a financial management application (FMA) executing on the processor;
receiving, by the FMA, a rating assigned to the first vendor by the user in response to the invitation;
determining, using the processor of the computer, a second vendor based on the rating being below a predefined threshold, wherein the second vendor is an alternative to the first vendor;
sending, by the FMA, information associated with the second vendor to the user;
receiving, by the FMA, a request from the user to switch from the first vendor to the second vendor in response to sending the information associated with the second vendor;
sending, by the FMA, a cancellation notice to the first vendor in response to receiving the request;
transmitting user information from the FMA to a computer of the second vendor for setting up a new account in response to receiving the request; and
charging the second vendor a fee for sending the information associated with the second vendor to the user.

2. The method of claim 1, further comprising:
displaying the information associated with the second vendor to the user.

3. The method of claim 1, wherein the rating is a binary satisfaction rating.

4. The method of claim 1, wherein the information associated with the second vendor comprises a service provided by the second vendor, wherein the service provided by the second vendor is a substitute for a service provided by the first vendor.

5. The method of claim 1, wherein switching the user from the first vendor to the second vendor comprises:
sending a notification to the first vendor to terminate a service provided by the first vendor to the user; and
sending a request to the second vendor to initiate a service provided by the second vendor to the user.

6. A non-transitory computer readable medium storing instructions to switch vendors, the instructions when executed by a processor of a computer comprising functionality to:
send an invitation to a user to rate a first vendor in response to the user designating the first vendor as a payee while paying a bill from the first vendor using a financial management application (FMA) executing on the processor;
receive a rating assigned to the first vendor by the user in response to the invitation;
determine a second vendor based on the rating being below a predefined threshold, wherein the second vendor is an alternative to the first vendor;
send information associated with the second vendor to the user;
receive a request from the user to switch from the first vendor to the second vendor in response to sending the information associated with the second vendor;
send a cancellation notice to the first vendor in response to receiving the request;
transmit user information from the FMA to a computer of the second vendor for setting up a new account in response to receiving the request; and
charge the second vendor a fee for sending the information associated with the second vendor to the user.

7. The non-transitory computer readable medium of claim 6, the instructions when executed by the processor further comprising functionality to:
display the information associated with the second vendor to the user.

8. The non-transitory computer readable medium of claim 6, wherein the rating is a binary satisfaction rating.

9. The non-transitory computer readable medium of claim 6, wherein the information associated with the second vendor comprises a service provided by the second vendor, and wherein the service provided by the second vendor is a substitute for a service provided by the first vendor.

10. The non-transitory computer readable medium of claim 6, wherein the instructions for switching the user from the first vendor to the second vendor further comprise functionality to:
send a notification to the first vendor to terminate a service provided by the first vendor to the user; and
send a request to the second vendor to initiate a service provided by the second vendor to the user.

11. A system for switching vendors, comprising:
a vendor database storing a first vendor a second vendor, wherein the second vendor is an alternative to the first vendor;
a referral software product executable on a processor of a computer and configured to:
send an invitation to a user to rate the first vendor in response to the user designating the first vendor as a payee while paying a bill from the first vendor using a financial management application (FMA) executing on the processor;
receive a rating assigned to the first vendor by the user in response to the invitation;
determine a second vendor based on the rating being below a predefined threshold, wherein the second vendor is an alternative to the first vendor; and
send information associated with the second vendor to the user; and
an interface executing on the processor and configured to:
receive a request from the user to switch from the first vendor to the second vendor in response to sending the information associated with the second vendor;
send a cancellation notice to the first vendor in response to receiving the request;
transmit user information from the FMA to a computer of the second vendor for setting up a new account in response to receiving the request; and
charge the second vendor a fee for sending the information associated with the second vendor to the user.

12. The system of claim 11, wherein the rating is a binary satisfaction rating.

* * * * *

UNITED STATES PATENT AND TRADEMARK OFFICE
CERTIFICATE OF CORRECTION

| | | |
|---|---|---|
| PATENT NO. | : 7,870,025 B2 | Page 1 of 1 |
| APPLICATION NO. | : 09/957643 | |
| DATED | : January 11, 2011 | |
| INVENTOR(S) | : Paul English | |

It is certified that error appears in the above-identified patent and that said Letters Patent is hereby corrected as shown below:

In Claim 11, Column 18 (line 34), --and-- should be added after "a first vendor".

In Claim 11, Column 18 (line 37), "executable" should read as --executing--.

Signed and Sealed this
Fifth Day of April, 2011

David J. Kappos
*Director of the United States Patent and Trademark Office*